US012683891B2

(12) United States Patent
Capelle et al.

(10) Patent No.: US 12,683,891 B2
(45) Date of Patent: Jul. 14, 2026

(54) METHOD FOR MANAGING DATA ROUTING IN A COMMUNICATION SYSTEM AND DEVICES FOR IMPLEMENTING THE METHOD

(71) Applicant: Orange, Issy-les-Moulineaux (FR)

(72) Inventors: Marc Capelle, Chatillon Cedex (FR); Sovatha Chou, Chatillon Cedex (FR); Flavien Joly Pottuz, Chatillon Cedex (FR); Stéphane Litkowski, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 74 days.

(21) Appl. No.: 17/791,197

(22) PCT Filed: Jan. 4, 2021

(86) PCT No.: PCT/FR2021/050001
§ 371 (c)(1),
(2) Date: Jul. 6, 2022

(87) PCT Pub. No.: WO2021/140289
PCT Pub. Date: Jul. 15, 2021

(65) Prior Publication Data
US 2023/0031496 A1 Feb. 2, 2023

(30) Foreign Application Priority Data
Jan. 6, 2020 (FR) ...................................... 2000068

(51) Int. Cl.
*H04L 45/12* (2022.01)
*H04L 43/106* (2022.01)
(Continued)

(52) U.S. Cl.
CPC .......... *H04L 45/123* (2013.01); *H04L 43/106* (2013.01); *H04L 45/122* (2013.01); *H04L 45/745* (2013.01)

(58) Field of Classification Search
CPC ... H04L 45/123; H04L 43/106; H04L 45/122; H04L 45/745
See application file for complete search history.

(56) References Cited

U.S. PATENT DOCUMENTS 5,544,325 A * 8/1996 Denny ...................... H04L 9/40
709/236
9,787,559 B1 * 10/2017 Schroeder ............. H04L 43/106
(Continued)

FOREIGN PATENT DOCUMENTS

| CN | 102801821 | * 11/2012 |
| CN | 110555020 | * 12/2019 |
| JP | 6820320 | * 1/2021 |

OTHER PUBLICATIONS

Litkowski et al., Timestamp support for BGP paths, Mar. 23, 2015 (Year: 2015).*
(Continued)

*Primary Examiner* — Madhu Woolcock
(74) *Attorney, Agent, or Firm* — Knobbe, Martens, Olson & Bear, LLP

(57) ABSTRACT

A method for measuring the propagation time of data routing information in a data communication system including a data communication network which comprises a plurality of router nodes operating according to a routing protocol for routing data packets between nodes of the data communication network is disclosed. The method includes, at a router node referred to as the generator node: generating timestamp data for the transmission of data routing information; inserting the transmission timestamp data into a field of a routing protocol message carrying the data routing information, the (Continued)

Generate timestamp data for the transmission of data routing information — 40

Insert the timestamp data into a field of a message of a routing protocol — 41

Send the message to a different router node — 42 field being intended to receive data relating to data routing; and sending the message to a different router node referred to as the receiver node.

9 Claims, 4 Drawing Sheets

(51) Int. Cl.
  *H04L 45/122*    (2022.01)
  *H04L 45/745*    (2022.01)

(56)         References Cited

U.S. PATENT DOCUMENTS

| | | | | |
|---|---|---|---|---|
| 10,084,559 | B1* | 9/2018 | Devineni | H04J 3/0661 |
| 10,893,022 | B1* | 1/2021 | Li | H04L 45/748 |
| 2002/0064224 | A1* | 5/2002 | Hata | H04L 69/04 |
| | | | | 375/240.01 |
| 2006/0182038 | A1 | 8/2006 | Nalawade et al. | |
| 2011/0320893 | A1* | 12/2011 | Kurts | G01R 31/3177 |
| | | | | 714/724 |
| 2012/0230335 | A1* | 9/2012 | Filsfils | H04L 45/7453 |
| | | | | 370/392 |
| 2012/0288095 | A1* | 11/2012 | McCann | H04W 40/36 |
| | | | | 380/270 |
| 2012/0290716 | A1* | 11/2012 | Ogielski | H04L 43/04 |
| | | | | 709/224 |
| 2013/0265881 | A1* | 10/2013 | Filsfils | H04L 45/70 |
| | | | | 370/241 |
| 2014/0297821 | A1* | 10/2014 | Lvin | H04L 41/064 |
| | | | | 709/223 |
| 2014/0337633 | A1* | 11/2014 | Yang | H04W 12/06 |
| | | | | 713/178 |
| 2014/0362690 | A1* | 12/2014 | Baduge | H04L 47/50 |
| | | | | 370/230 |
| 2015/0052240 | A1* | 2/2015 | Griswold | H04L 43/0852 |
| | | | | 709/224 |
| 2016/0127149 | A1* | 5/2016 | Xue | H04L 41/0803 |
| | | | | 370/392 |
| 2016/0330031 | A1* | 11/2016 | Drego | H04L 9/3239 |
| 2017/0222909 | A1 | 8/2017 | Sadana et al. | |
| 2018/0268411 | A1* | 9/2018 | Voldman | G06Q 20/409 |
| 2019/0045475 | A1* | 2/2019 | Kasichainula | G05B 19/0423 |
| 2020/0084147 | A1* | 3/2020 | Gandhi | H04L 41/40 |

OTHER PUBLICATIONS

Garcia-Martinez, Alberto et al., BGP Route Propagation Times11, IEEE Communications Letters, IEEE Service Center, Piscataway, NJ, US, vol. 23, No. 12, Dec. 1, 2019, pp. 2432-2436.
IETF RFC 1142 "OSI IS-IS Intra-domain Routing Protocol", Feb. 1990.
IETF RFC 1771 "A Border Gateway Protocol 4 (BGP-4)", Mar. 1995.
IETF RFC 2328 "OSPF Version 2", Apr. 1998.
IETF RFC 4271 "A Border Gateway Protocol 4 (BGP-4)", Jan. 2006.
IETF RFC 4456 "BGP Route Reflection—An alternative to Full Mesh Internal BGP (IBGP)", Apr. 2006.
IETF RFC 5340 "OSPF for IPV6", Jul. 2008.
Preliminary Research Report for French Application No. FR2000068, Sep. 25, 2020.
International Search Report for PCT Application No. PCT/FR2021/050001 dated Mar. 18, 2021.

* cited by examiner

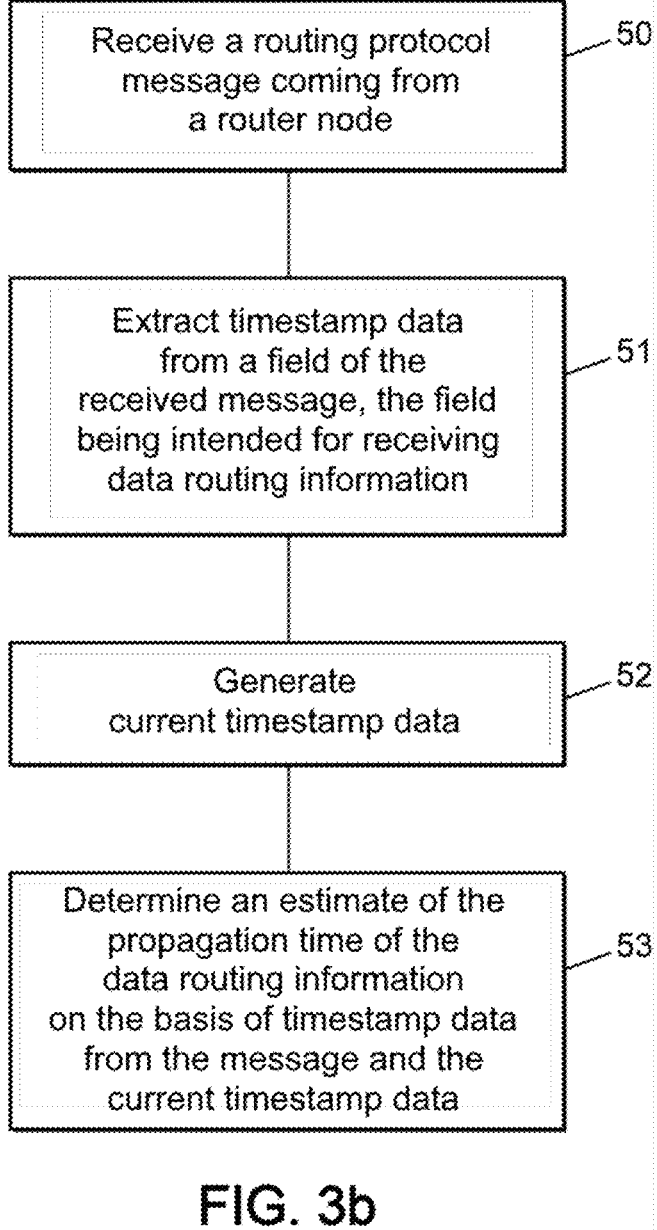

Receive a routing protocol
message coming from
a router node — 50

Extract timestamp data
from a field of the
received message, the field
being intended for receiving
data routing information — 51

Generate
current timestamp data — 52

Determine an estimate of the
propagation time of the
data routing information
on the basis of timestamp data
from the message and the
current timestamp data — 53

FIG. 3b

METHOD FOR MANAGING DATA ROUTING IN A COMMUNICATION SYSTEM AND DEVICES FOR IMPLEMENTING THE METHOD

CROSS-REFERENCE TO RELATED APPLICATIONS

This application is filed under 35 U.S.C. § 371 as the U.S. National Phase of Application No. PCT/FR2021/050001 entitled "DATA ROUTING IN A COMMUNICATION SYSTEM" and filed Jan. 4, 2021, and which claims priority to FR 2000068 filed Jan. 6, 2020, each of which is incorporated by reference in its entirety.

BACKGROUND

Field

The present subject disclosure relates to a method for managing data routing in a data communication system, as well as to devices and software for implementing the method. It applies in particular to measuring the propagation time of routing information in a data communication system.

Description of the Related Technology

The Border Gateway Protocol (BGP) is a routing protocol between autonomous systems, designed to be implemented in TCP/IP type networks. The BGP protocol is specified in the "Request For Comments" document, initially no. 1771 then updated in no. 4271 entitled "A Border Gateway Protocol 4 (BGP-4)", published by the "Internet Engineering Task Force" (IETF) organization.

One of the functions of the BGP protocol is to enable the exchange of network accessibility information between two autonomous systems. The information exchanged includes information about the list of autonomous systems that the accessibility information travels through, which makes it possible to construct a connectivity graph between the two autonomous systems, and remove any routing loops from this graph and implement decision policies at the autonomous systems.

The implementation of decision policies using the BGP protocol is carried out by a mechanism of advertisements sent by a node called a "BGP speaker" to its corresponding nodes in neighboring autonomous systems of the routes that the speaker node uses. This mechanism is based on the principle of hop-by-hop routing currently used in the Internet.

SUMMARY

The BGP protocol is a routing protocol currently in widespread use in Internet networks. Its implementation within operator networks makes it possible in particular to exchange routing and accessibility information between operator networks, which are autonomous systems from the point of view of the BGP protocol. For example, the BGP protocol can be used to advertise Internet prefixes (typically 4-byte IPv4 routes or 16-byte IPv6 routes), or virtual private network (VPN) prefixes such as 12-byte VPN-IPv4 routes, or 24-byte VPN-IPv6 routes.

However, the use of routing protocols such as the BGP protocol in networks with a high density of nodes requires having performance measurement tools in order to optimize the choices for implementing these protocols, in particular on networks operated by telecom operators.

An object of the present subject disclosure is to at least partially remedy the above disadvantages.

According to a first aspect, a method is proposed for measuring the propagation time of data routing information in a data communication system comprising a data communication network which comprises a plurality of router nodes operating according to a routing protocol for routing data packets between nodes of the data communication network, the method comprising, at a router node referred to as the generator node: generating timestamp data for the transmission of data routing information; inserting the transmission timestamp data into a field of a routing protocol message carrying data routing information, the field being intended to receive data relating to data routing; and sending the message to a different router node referred to as the receiver node.

According to another aspect, a method is proposed for measuring the propagation time of data routing information in a data communication system comprising a data communication network which comprises a plurality of router nodes operating according to a routing protocol for routing data packets between nodes of the data communication network, the method comprising, at a router node referred to as the receiver node: receiving a routing protocol message carrying data routing information from another router node; extracting timestamp data from a field of the received message, the field being intended to receive data relating to data routing; generating current timestamp data; and determining an estimate of the propagation time of the data routing information between the generator node and the receiver node, on the basis of the timestamp data from the message and the current timestamp data.

Among other aspects, the proposed methods deal with a problem which has been identified by the inventors, in which the speed for advertising the creation, modification, or removal of an IP or VPN prefix is a criterion which becomes predominant in the choice of operational equipment which utilize the BGP routing protocol.

To measure the propagation time of a VPN prefix in a router or in a network (comprising a set of routers), it would be possible to use an IP or VPN prefix generator and a traffic analyzer. By synchronizing these two devices/tools, a tool could be developed to identify/associate the prefixes that have been generated with the information that has been collected in order to be able to deduce the propagation time of the prefixes.

This possibility would be complex to implement. Moreover, in addition to the implementation complexity, there would still remain approximations concerning the exact moment of the transmission of a prefix, and therefore uncertainties in the results obtained.

The proposed methods advantageously make it possible to estimate the propagation time of data routing information, such as a data routing prefix for example, while minimizing the approximations concerning the exact moment of transmission of the information, by inserting timestamp data for the transmission of data routing information into a field of a routing protocol message used, such as the BGP protocol for example, then sending the message.

The destination router node for the message can then, upon receiving a routing protocol message corresponding to the message sent, extract the transmission timestamp data from a field of the received message, and estimate the propagation time of the data routing information on the basis of the received timestamp data and the current timestamp data.

Consequently, whether at the router generating the transmission timestamp data for the data routing information or at the router receiving these timestamp data and processing them in order to estimate a propagation time for the data routing information, one or more routing protocol messages are used without the proposed methods requiring changes to or additional development of the routing protocol used.

Thus, advantageously, the proposed methods do not require a complex implementation, particularly as they do not require modifying the routing protocol used. They take advantage of the routing protocol by using a field of a message of the routing protocol to insert timestamp data. Any processing of the message by one or more intermediate router nodes is therefore not impacted by the proposed methods, which are therefore advantageously transparent for this (these) intermediate node(s).

The proposed methods thus advantageously make it possible to measure, accurately and without implementation complexity, the propagation time of routing information according to a routing protocol within a router or within a network.

The features discussed in the following paragraphs may optionally be implemented. They may be implemented independently of each other or in combination with each other:

In one or more embodiments, the proposed method further comprises: extracting, from the received message, information relating to a router where the data routing information originated, referred to as the generator node.

In one or more embodiments, the timestamp data are inserted into the message as an Internet Protocol (IP) address prefix or a Virtual Private Network (VPN) address prefix.

In one or more embodiments, the routing protocol is the Border Gateway Protocol, BGP. BGP defines different types of packets (OPEN, NOTIFICATION, UPDATE, KEEPAL-IVE, etc.); only the BGP-UPDATE packet is responsible for advertising and withdrawing routing information. In one or more embodiments, the transmission timestamp data are inserted into the "attribute" part, the "withdrawn" part, or the "NLRI" part of the BGP-UPDATE message. In one or more embodiments, the transmission timestamp data are inserted into the "attribute" part (using a predefined attribute), the "withdrawn" part (as an Internet or VPN prefix), or the "NLRI" part (as an Internet or VPN prefix) of the BGP-UPDA message.

In one or more embodiments, the message of the routing protocol is of the BGP-WITHDRAW type.

In one or more embodiments, the routing protocol is the Intermediate System to Intermediate System (IS-IS (RFC 1142)) internal routing protocol, or the Open Shortest Path First (OSPF (RFC 2328 then RFC 5340)) IP internal routing protocol.

According to another aspect, a device is proposed comprising a processor and a radio-frequency unit operatively coupled to the processor, the device being configured for implementing a method according to one of the embodiments proposed in this description.

Another aspect relates to a computer program, load able into a memory associated with a processor, and comprising portions of code for implementing a method as proposed in this description during the execution of said program by the processor.

Another aspect concerns a set of data representing, for example through compression or encoding, a computer program as proposed in this description.

Another aspect relates to a non-transitory storage medium for a computer-executable program, comprising a set of data representing one or more programs, said one or more programs comprising instructions for, when said one or more programs are executed by a computer comprising a processor operatively coupled to a memory and to an input/output interface for data communication, causing the computer to manage a data communication node according to a method for managing a data communication node according to one of the embodiments proposed in this description.

BRIEF DESCRIPTION OF THE DRAWINGS

Other features and advantages of the present subject disclosure will become apparent in the following description of some non-limiting embodiments, with reference to the accompanying drawings, in which:

FIG. 3$b$ is a diagram illustrating a proposed method according to one or more embodiments;

DETAILED DESCRIPTION OF CERTAIN ILLUSTRATIVE EMBODIMENTS

Figure 1:
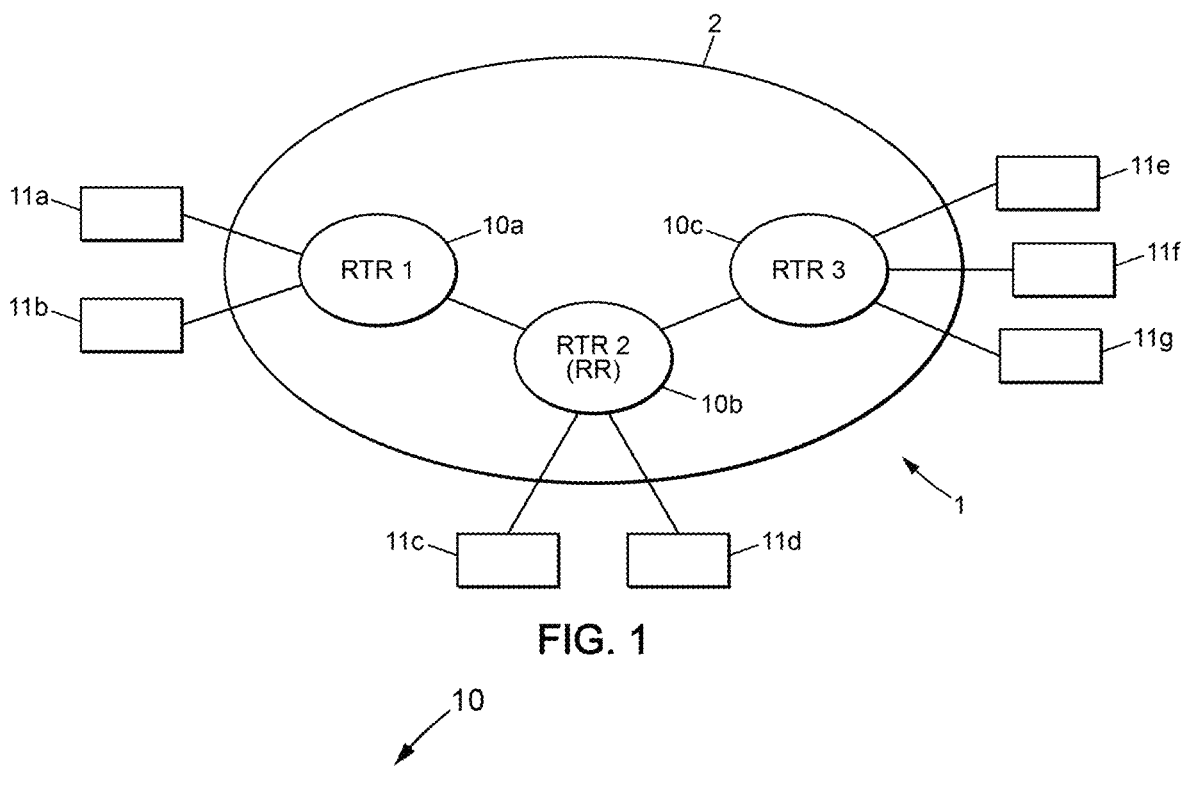
FIG. 1 is a diagram illustrating an example of a system for implementing one or more embodiments of the proposed method.

In the following detailed description of some embodiments of the present subject disclosure, many specific details are presented to enable a more complete understanding. However, those skilled in the art will realize that some embodiments can be applied without these specific details. In other cases, well-known features are not described in detail to avoid unnecessarily complicating the description.

This description refers to functions, engines, units, modules, platforms, and diagram illustrations of methods and devices according to one or more embodiments. Each of the described functions, engines, modules, platforms, units, and diagrams may be implemented in hardware, software (including embedded software ("firmware"), or "middleware"), microcode, or any combination of these. In the case of a software implementation, the functions, engines, units, modules, and/or diagram illustrations may be implemented by computer program instructions or software code, which may be stored or transmitted on a computer-readable medium, including a non-transitory medium, or a medium loaded into the memory of a general-purpose or dedicated computer or any other programmable apparatus or device for processing data in order to produce a machine, such that the computer program instructions or software code executed on the computer or the programmable apparatus or device for processing data, constitute means of implementing these functions.

Embodiments of a computer-readable medium include, but are not limited to, computer storage media and communication media, including any medium that facilitates the transfer of a computer program from one location to another. "Computer storage medium (media)" is understood to mean any physical medium that can be accessed by computer.

Examples of computer storage media include, but are not limited to, flash memory disks or components or any other flash memory devices (for example USB drives, thumb drives, memory sticks, key drives), CD-ROMs or other optical data storage devices, DVDs, magnetic disk data storage devices or other magnetic data storage devices, data memory components, RAM, ROM, EEPROM memories, memory cards ("smart cards"), SSD ("Solid State Drive") type memories, and any other form of medium usable for transporting or storing or saving data or data structures which can be read by a computer processor.

In addition, various forms of computer-readable media can transmit or carry instructions to a computer, such as a router, gateway, server, or any data transmission device, whether via wired transmission (by coaxial cable, optical fiber, telephone wires, DSL cable, or Ethernet cable), wireless transmission (by infrared, radio, cellular, microwaves), or virtualized transmission devices (virtual router, virtual gateway, end of virtual tunnel, virtual firewall). Depending on the embodiments, the instructions may comprise code in any computer programming language or computer program element, such as, without limitation, assembly languages, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

In addition, the terms "in particular", "for example", "example", "typically" are used in this description to designate examples or illustrations of non-limiting embodiments, which do not necessarily correspond to embodiments that are preferred or advantageous over other possible aspects or embodiments.

In this description, "server" or "platform" is understood to mean any point of service (virtualized or not) or device offering data processing, one or more databases, and/or data communication functions. For example, and without limitation, the term "server" or the term "platform" may refer to a physical processor operatively coupled with associated communication, database, and data storage functions, or may refer to a network, group, collection or complex of processors and associated data storage and networking devices, as well as an operating system and one or more database system(s) and application software to support the services and functions provided by the server. A computing device can be configured to send and receive signals, via wireless and/or wired transmission network(s), or can be configured for processing and/or storing data or signals, and can therefore operate as a server. Thus, devices configured to operate as a server may include, as non-limiting examples, rack-mounted dedicated servers, desktop computers, laptop computers, service gateways (sometimes called "box" or "residential gateway"), multimedia decoders (sometimes called "set-top boxes"), integrated devices combining various functionalities such as two or more of the functionalities mentioned above. Servers can vary greatly in configuration or capabilities, but a server will generally include one or more central processing unit(s) and a memory. A server may also include one or more mass storage device(s), one or more power supply/ies, one or more wireless and/or wired network interface(s), one or more input/output interface(s), one or more operating system(s), such as Windows Server, Mac OS X, Unix, Linux, FreeBSD, or an equivalent.

The terms "network" and "communication network" as used in this description refer to one or more data links that can couple or connect devices, possibly virtualized, in such a way as to allow the transport of data between computer systems and/or modules and/or other electronic devices or equipment, such as between a server and a client device or other types of devices, including between wireless devices paired or connected by a wireless network for example. A network may also include mass storage for storing data, such as a NAS (network attached storage), a SAN (storage area network), or any other form of machine- or computer-readable medium, for example. A network may comprise, in whole or in part, the Internet, one or more local area networks (LANs), one or more networks of the WAN type ("wide area networks"), wired connections, wireless connections, cellular connections, or any combination of these various networks. Similarly, subnetworks may use different architectures or be compliant or compatible with different protocols, and interoperate with larger networks. Different types of devices may be used to make different architectures or different protocols interoperable. For example, a router may be used to provide a communication link or data link between two LANs that would otherwise be separate and independent.

The terms "operatively coupled", "coupled", "mounted", "connected", and their various variants and forms used in this description refer to couplings, connections, assemblies, which may be direct or indirect, and in particular include connections between electronic devices or between portions of such devices which enable operations and functions as described in this description. Furthermore, the terms "connected" and "coupled" are not limited to physical or mechanical connections or couplings. For example, an operative coupling may include one or more wired connection(s) and/or one or more wireless connection(s) between two or more devices that enable simplex and/or duplex communication links between the devices or portions of the devices. According to another example, an operative coupling or a connection may include a coupling by wired and/or wireless link to enable data communications between a server of the proposed system and another device of the system.

The terms "application" or "application program" (AP) and their variants ("app", "webapp", etc.) as used in this description correspond to any tool that functions and is operated by means of a computer, for providing or performing one or more function(s) or task(s) for a user or another application program. To interact with and control an application program, a user interface may be provided on the device on which the application program is implemented. For example, a graphical user interface (GUI) may be generated and displayed on a screen of the user device, or an audio user interface may be played to the user using a speaker, headset, or audio output.

"BGP protocol" is understood to mean a routing protocol in accordance with specification RFC 1771 then RFC 4271 and/or any other previous and/or corresponding specification, as published by the IETF or by any other standardization organization or group, and/or their evolutions.

Although described in the context of embodiments using the BGP protocol, those skilled in the art will understand that the proposed methods, systems, software, and devices are not limited to a particular routing protocol, and that these could be implemented with other routing protocols, such as, for example, the IS-IS protocol (RFC 1142) or the OSPF protocol (RFC 2328 then RFC 5340).

FIG. 1 is a diagram illustrating one or more embodiments in which a data communication system (1) comprising a plurality of N interconnected routers RTR1, RTR2, RTR3 (10a, 10b, 10c) (N=3 in the example shown) forming a network (2), configured for implementing a routing protocol such as the BGP protocol for example. The three routers RTR1 (10a), RTR2 (10b), and RTR3 (10c) illustrated in the figure can therefore be routers utilizing the BGP protocol and therefore able to exchange BGP protocol messages and to implement the functionalities defined for the BGP protocol. Routers RTR1 (10a), RTR2 (10b), and RTR3 (10c) may be connected to devices (11a, 11b, 11c, 11d, 11e, 11f, 11g) which do not utilize the BGP protocol, for example such as set-top boxes, boxes, switches, computers, user devices (tablets, etc.).

In particular, each of the network routers (1) can be configured to operate in "BGP speaker" mode as defined by RFC 1771 and then RFC 4271. In this mode, when a router (e.g. router RTR1 (10a) in FIG. 1) receives an external route for routing data and is selected as the best path for that data, it must advertise this information to other routers in the network (for example routers RTR2 and RTR3 of the network (1) in FIG. 1).

To do so, in cases where the network (1) is configured in a mesh network architecture, the advertising router RTR1 must advertise its information to each of the other routers, RTR2 and RTR3 in the example of FIG. 1, which leads to using communication resources between each pair of routers RTR1-RTR2 and RTR1-RTR3.

In order to avoid a large volume of BGP signaling traffic in the case where the network (1) comprises a large number of routers, the network may use one or more of the route reflection functions described in RFC 4456 published by the IETF, entitled "BGP Route Reflection—An Alternative to Full Mesh IBGP".

The route reflector function typically makes it possible to avoid the interconnection of a large number of routers in a mesh network architecture in which the routers are for example interconnected in pairs. The RR node thus avoids the scaling problems that arise when a large number of routers must all receive external routing information. Route reflection thus makes it possible to avoid the implementation of a mesh network type of architecture, by implementing a route reflector (RR) function, as defined in RFC 4456, within one of the routers of the network (1).

The network architecture can then provide for one of the router nodes in the network operating in RR node mode, in which case the RR node will be configured to exchange data with each of the other router nodes in the network. In practice, the number of routers connected to an RR node could reach several hundred, which shows the advantage there can be in using an RR node.

In one or more embodiments, the RR node may be configured to implement one or more of the functions specified in RFC 4456. Thus, as shown in FIG. 1, a network comprising a plurality of routers (RTR1, 10a; RTR2, 10b; RTR3, 10c) can use an RR node (RTR2, 10b) to implement the distribution of external routing information to all routers in the network through the RR node (RTR2, 10b). When a router has routing information to share with the other routers in the network, it can send this information to the RR node which handles the redistribution to the other routers.

The RR router node RTR2 (10b) can thus provide an interface between all the routers RTR1 (10a), RTR3 (10c) of the network (2), these routers only needing to establish a data communication session with the RR router node RTR2 (10b). In the example of FIG. 1, each router RTR1 (10a), RTR3 (10c) other than the RR router node RTR2 (10b) may have previously established a data communication session with the RR router node RTR2 (10b) in order to exchange routing protocol messages with this RR router node RTR2 (10b).

Depending on the embodiment, the RR function may be implemented, in whole or in part, within one of the router nodes of the network, and/or in whole or in part within another type of network node.

For example, in one or more embodiments, the network (2) formed by the router nodes may be any type of data communication network, for example such as a packet data network (PDN), and include one or more data transmission networks of the IP network type ("Internet Protocol"), and use communication links based on TCP, IP, and/or or any type of protocol usable for data communication in a data communication network. Furthermore, depending on the embodiment, the network (2) may use one or more routing protocols, for example such as the BGP protocol, the ISIS protocol, and/or the OSPF protocol.

Figure 2:
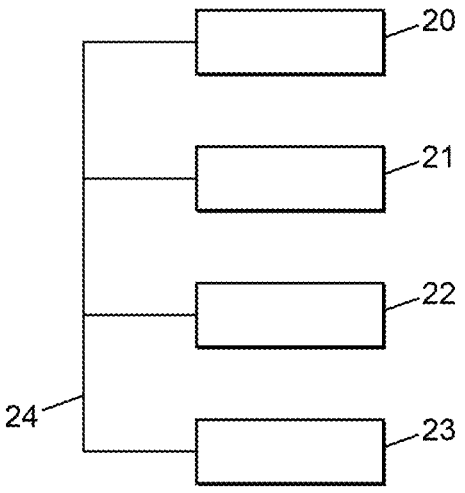
FIG. 2 is a diagram illustrating an example of an architecture of a router node for implementing one or more embodiments of the proposed method.

Referring to FIG. 2, in one or more embodiments, each router node (10) of the network (for example each of the router nodes RTR1 (10a), RTR2 (10b), RTR3 (10c) of FIG. 1) may include a data communication unit (20), a controller (21), a routing unit (22), and a propagation time measurement unit (23). Depending on the embodiment, the data communication unit (20), routing unit (22), and propagation time measurement unit (23) could be operatively coupled to the controller (21) via a communication bus (24), or via any communication link, possibly comprising one or more hardware connectors. In the architecture of the router node (10) shown in FIG. 2, the ensemble of the data communication unit (20), controller (21), routing unit (22), propagation time measurement unit (23), functional unit (24) and communication bus (24) forms a router node according to one or more embodiments, which moreover may also include other components, units, and/or functions not shown in the figure.

The controller (21) may comprise one or more processors, such as a microprocessor, microcontroller, or other hardware processor, associated memory (e.g. random access memory (RAM), cache memory, flash memory, etc.), and may be able to be configured to control the data communication unit (20), the routing unit (22), the propagation time measurement unit (23), in order to control the use of the router node (10) according to one or more embodiments of the proposed method, for example by executing a computer program comprising portions of code for implementing a method for measuring the propagation time of data routing information as proposed in this description. Depending on the embodiment, an associated memory of the controller (21), external or internal to the controller (21), contains instructions which, when executed by the controller (21), cause this controller (21) to carry out or control the data communication unit (20), routing unit (22), and/or propagation time measurement unit (23) portions of the exemplary implementations of the proposed method described in this description. The controller (21) may be a component implementing a processor or a computing unit for measuring the propagation time of data routing information according to the proposed method and the control of the propagation time measurement unit (23) of the device (10), such as a microcontroller for example.

The propagation time measurement unit (23) may be implemented, depending on the chosen embodiment, in the form of one or more software items, or a combination of one or more hardware and one or more software items, configured for implementing embodiments of the management method described in this description. In particular, the router node (10) may be configured via the propagation time measurement unit (23) to operate according to a plurality of operating modes, among which there are what are referred to as a "generator node" operating mode and a "receiver node" operating mode, and to operate in generator node mode and/or in receiver node mode according to one or more embodiments described in this description.

The software part of the propagation time measurement unit (23) may constitute or be part of driver software for the router node (10). In the following, "driver software" will designate a set of one or more software items configured for implementing a method for measuring the propagation time of data routing information as proposed in this description. Depending on the architecture of the router node, the driver software is configured to be executable on a processor of the router node, and/or on a processor of a computer device to which part of the router node is connected.

The data communication unit (20) may be implemented, depending on the chosen embodiment, as a combination of one or more hardware and one or more software items, and may comprise one or more wired, radiofrequency, and/or optical communication hardware items, and communication unit driver software, for example executable by the controller (21), or, in another architecture of the communication node, executable by a processor of the data communication unit (20), and loaded into memory accessible by a processor configured to execute the communication unit driver software. In one or more embodiments, the data communication unit (20) may include a data communication interface.

The routing unit (22) may be implemented, depending on the chosen embodiment, as a combination of one or more hardware and one or more software items, and may include one or more routing protocol management units, for example executable by the controller (21), or, in another architecture of the router node, executable by a processor of the routing unit (22), and loaded into a memory accessible by a processor configured to execute the routing unit driver software. For example, the routing unit (22) could be configured to implement one or more of the functionalities of a routing protocol, such as the BGP protocol, the ISIS protocol, and/or the OSPF protocol.

The router node device (10) may be implemented in software form, in which case it takes the form of a program executable by a processor, or in hardware form, such as an application specific integrated circuit (ASIC), a system on chip (SOC), or in the form of a combination of hardware and software elements, such as for example a software program intended to be loaded and executed on a FPGA (Field Programmable Gate Array) type of component. SOCs (system on chip) are embedded systems that integrate all the components of an electronic system in a single chip. An ASIC (Application-Specific Integrated Circuit) is a specialized electronic circuit that combines functionalities tailored to a given application. ASICs are usually configured at manufacture and the user can only simulate them. FPGA (Field-Programmable Gate Array) type programmable logic circuits are electronic circuits reconfigurable by the user.

The router node device (10) may also use hybrid architectures, for example such as architectures based on a CPU+FPGA, a GPU (Graphics Processing Unit), or an MPPA (Multi-Purpose Processor Array).

Depending on the embodiment, different architectures of the router node device (10) may be adopted for the hardware part of the device and for the software part of the device, as appropriate.

Those skilled in the art will understand that the proposed method is not limited to a particular architecture of the router node (10), data communication unit (20), controller (21), routing unit (22), propagation time measurement unit (23), and communication bus (24), or of the coupling between these elements illustrating an exemplary embodiment in FIG. 2.

The following describes methods for measuring the propagation time of data routing information in a data communication system such as the one illustrated in FIGS. 1 and 2, in one or more embodiments.

Figure 3A:
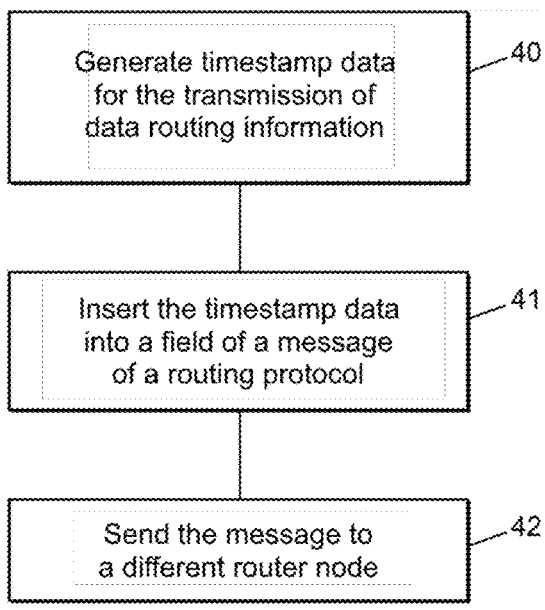
FIG. 3$a$ is a diagram illustrating a proposed method according to one or more embodiments.

Referring to FIGS. 3a and 3b, in one or more embodiments, at least one of the communication nodes (RTR2, 10b) of the system (1) can be configured to operate in RR router mode, and another router node of the system (1) (RTR1, 10a) can be configured to generate (40) transmission timestamp data for data routing information, and to insert (41) the transmission timestamp data in a field of a message of the BGP routing protocol, the field being intended to receive data relating to data routing.

Router node RTR1 (10a) can then send (42) the message to the RR router node RTR2 in order to advertise to the other routers of the network (2) the data routing information carried by the message. For example, in the case where the BGP routing protocol is used, the protocol message used to implement the proposed method can be, depending on the embodiment, of the "UPDATE" type or of the "WITHDRAWN" type. Router node RTR1 thus sends timestamp data in the form of routing information as part of the advertisement of the routing information to the other routers of the network to which the routing information must be advertised in the routing protocol used.

Upon receiving the message from router node RTR1 (10a), the RR router node RTR2 (10b) performs the processing necessary to transmit the routing information contained in the message to the other router nodes of the network (2), and in particular router node RTR3 (10c).

In one or more embodiments, node RTR3 (10c) may be configured, upon receiving (50) a routing protocol message from another router node, for example the RR router node RTR2 (10b) in the exemplary network illustrated in FIG. 1, to extract (51) timestamp data from a field of the message received, the field being intended to receive data relating to data routing. Referring to FIG. 1, the timestamp data may correspond to the data inserted by router node RTR1 (10a) in a field of the routing protocol message sent to the RR router node RTR2 (10b). Router node RTR3 (10c) can therefore be configured as a receiver node for measuring the processing and propagation times of a routing protocol message sent by another router node configured to operate as a test message sending node, by a router or network of routers being tested. In particular, the receiving router node may be configured (for example preconfigured) to identify, among the messages received or among the different types of messages received, those used by the sending router node to insert transmission timestamp information. In the same manner, the sending router node may be configured (for example preconfigured) to insert timestamp information in a protocol message that is predefined or of a predefined type (for example one or more messages of the UPDATE and/or WITHDRAW type for the BGP routing protocol), according to a test configuration corresponding to the one used to configure the receiving router node.

In one or more embodiments, the node RTR3 (10c) may further be configured to extract, from the received message, information relating to a router where said data routing information originated: either, in the example of FIG. 1, extracting information from the received message making it possible to identify the router node RTR1 (10a) where the received message originated (and therefore the timestamp data that it contains).

In one or more embodiments, the router node RTR3 (10c) may further be configured to generate (52) current timestamp data and then to determine (53) an estimate of the propagation time of the routing information between the router where the message originated and the destination router for the message (i.e. the router node RTR3 (10c) itself), based on a difference between the timestamp data extracted from the message and the current timestamp data.

Referring to FIG. 1, the destination router node for the message, RTR3 (10c), may be configured to estimate, upon receiving the message from the router node RTR1 (10a) via the RR router node RTR2 (10b), a propagation time for the message, this propagation time including the propagation of the message from the router where the message originated, RTR1 (10a), to the destination router, RTR3 (10c), and the processing of the message by the intermediate node RTR2 (10b). The destination router node RTR3 (10c) can thus advantageously measure the cumulative time required for the RR router node RTR2 (10b) to process the message, once received from the router node of origin RTR1 (10a), and to retransmit it to all the other router nodes of the network (2).

In a context of an implementation using the BGP protocol, BGP messages of the UPDATE or WITHDRAWN type may be used in one or more embodiments.

In one or more embodiments, the timestamp data may be in 32-bit floating number format, with the integer part representing the number of seconds elapsed since 01/01/1970 and the decimal part representing the number of microseconds to add to the number of seconds.

The BGP protocol defines BGP messages of the UPDATE type, which among other aspects are for advertising and/or withdrawing information relating to routing, such as accessibility information, for example a prefix. UPDATE-type BGP messages comprise four distinct parts: a header, a path attribute part, a withdrawn part, and an NLRI part ("Network Layer Reachability Information"). The "path attribute" part can be used to indicate the list of properties associated with the routing information (for example the prefix). The "withdrawn" part can be used to indicate accessibility information, such as a set of prefixes to be withdrawn. The "NLRI" part can be used to indicate prefixes to be created/modified and with which the attribute or attributes indicated in the "attribute" part are associated.

Different attribute types can be entered in the "attribute" part, including the mandatory attribute type "ORIGIN" to define the origin of the routing information, the mandatory attribute type "AS-PATH" to define a sequence of Autonomous System route segments, the mandatory attribute type "NEXT_HOP" to define the IP address of a border router, the optional attribute type "MULTI_EXIT_DISC" to define different exit points from an autonomous system, the discretionary attribute type "LOCAL_PREF" to inform routers in an autonomous system of an advertising router's degree of preference for an advertised route, the discretionary attribute type "ATOMIC_AGGREGATE", or the optional attribute type "AGGREGATOR".

One can refer to the RFC 4271 specification, for example the March 1995 edition, for a detailed description of the BGP UPDATE message and the fields of this message.

In one or more embodiments, timestamp-type information may be inserted, in the form of timestamp data, into a BGP protocol message, for example into an UPDATE type message.

In one or more embodiments, the timestamp data may be inserted into a BGP UPDATE message field intended to receive data representing data routing information, for example such as prefix data (for example IP address prefix or VPN prefix).

In one or more embodiments, timestamp data may be inserted into an UPDATE message field corresponding to the "attribute" part. For example, timestamp data may be inserted as an attribute with an already existing attribute type, such as the optional "LOCAL_PREF" type. Thus, an attribute type having a format compatible with that of the timestamp data to be transmitted can be used to transmit these data in a BGP UPDATE message. The timestamp data are then transmitted in an UPDATE message as an attribute of the "LOCAL_PREF" type.

In one or more embodiments, timestamp data may be inserted into an UPDATE message field corresponding to the "withdrawn" part. For example, timestamp data may be inserted as an Internet or VPN prefix. Thus, as the "withdrawn" field is being used to indicate a list of IP address prefixes for the routes which are withdrawn from service, it is possible to transmit timestamp data having a format compatible with that of one or more IP address prefixes by inserting these data as one or more IP address prefixes in a BGP UPDATE message. The timestamp data are then transmitted in the "withdrawn" field of an UPDATE message as IP address prefix(es).

In one or more embodiments, timestamp data may be inserted into an UPDATE message field corresponding to the "NLRI" part. For example, timestamp data may be inserted as an Internet or VPN prefix. Thus, as the "NLRI" field is being used to indicate a list of IP address prefixes, it is possible to transmit timestamp data having a format compatible with that of one or more IP address prefixes by inserting these data as being one or more IP address prefixes in a BGP UPDATE message. The timestamp data are then transmitted in the "NLRI" field of an UPDATE message as IP address prefix(es).

Thus, in one or more embodiments, a BGP router referred to as a "generator" router or an "origin" router, generates a BGP message of the UPDATE type, and inserts transmission timestamp data into the BGP UPDATE message as an attribute in the "attribute" part, as an IP address prefix or VPN prefix in the "withdrawn" part, and/or as an IP address prefix or VPN prefix in the "NLRI" part. The generator BGP router then sends the BGP UPDATE message to the router (for example an RR router) or to the network whose propagation time (including the processing time) is to be measured.

Said router or network performs the processing necessary to take into account the information contained in the BGP UPDATE message sent by the "generator" router, and to propagate this message to its neighbors after having performed the required processing.

One of the routers receiving the message from said router or network, referred to as the "receiver" router or "destination" router, is configured to extract the timestamp data from the message received. For example, depending on the embodiment, if the generator router is configured to insert transmission timestamp data into a BGP UPDATE message as an attribute in the "attribute" part, as an IP address or VPN prefix in the "withdrawn" part, and/or as an IP address prefix or VPN prefix in the "NLRI" part, the receiver router will be correspondingly configured to extract these timestamp data from a received BGP UPDATE message, as an attribute in the "attribute" part, as an IP address prefix or VPN prefix in the "withdrawn" part, and/or as an IP address prefix or VPN prefix in the "NLRI" part, respectively.

The receiver router can then compare the received timestamp data with its own timestamp, in order to deduce the propagation time (including processing time) required by said router or network.

Figure 4:
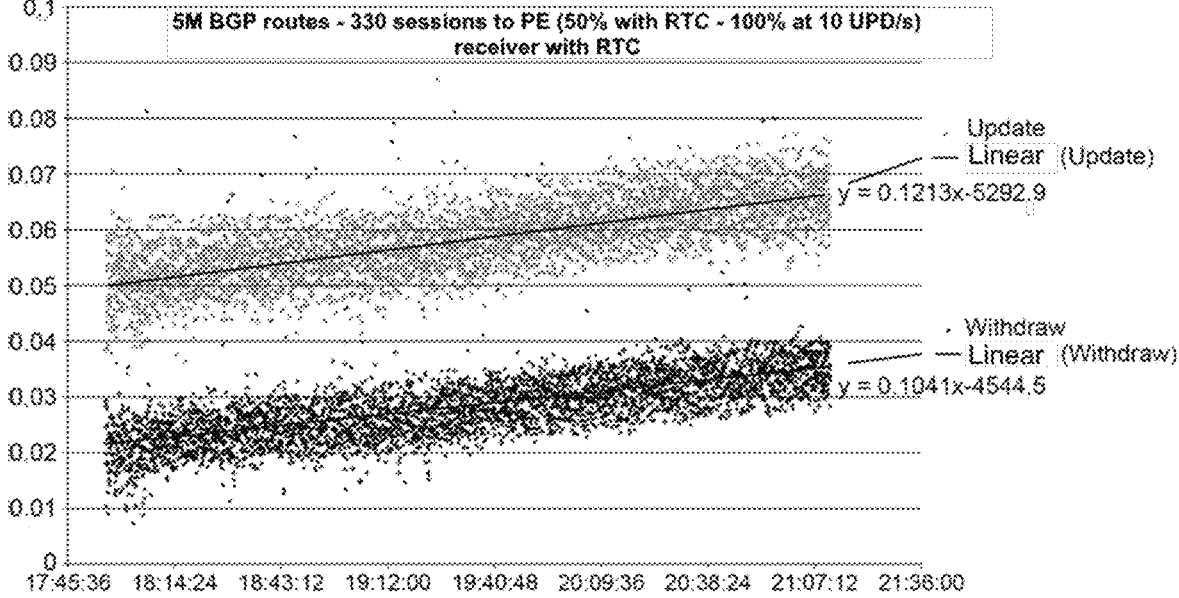
FIG. 4 is a diagram illustrating an example of propagation time measurements in a route reflector router in one or more embodiments of the proposed method.

FIG. 4 illustrates an example of propagation time measurements in an RR router in one or more embodiments.

These measurements are the results of tests carried out by running test routines on a BGP test generator router preconfigured with 5 million BGP routes across 330 data communication sessions with an RR router.

In a first test, the test generator router executes an infinite loop routine, each loop instance comprising (1) the execution of ten instances of a loop for generating and transmitting a BGP UPDATE message containing timestamp data in the "Route_Distinguisher" field (which is an element of a VPN-IPv4 or VPN-IPv6 route) of the BGP UPDATE message, with a predetermined interval (for example 0.5 s) between each instance, (2) a predetermined wait time (for example 10 s), (3) execution of another ten instances of a loop for generating and transmitting a BGP UPDATE message containing timestamp data in the "Route_Distinguisher" field (which is an element of a VPN-IPv4 or VPN-IPv6 route) of the BGP UPDATE message, with a predetermined interval (for example 0.5 s) between each instance, and (4) a predetermined wait time (for example 10 s).

The BGP test generator router therefore sends more or less continuously to an RR router whose processing and propagation time is to be measured, ten UPDATE messages which contain route modifications and timestamp data. The RR router processes each of these messages and advertises them to a BGP test receiver router. The BGP test receiver router is configured to receive the BGP UPDATE messages from the RR router, extract from each received BGP UPDATE message timestamp data from the "Route_Distinguisher" field of the message, and determine a measurement of the processing and propagation time at the RR router based on its own timestamp and the timestamp data received.

The results of this first test correspond to the lower point cluster of FIG. 4, with a trend line of the equation: y=0.1041x−4544.5.

In a second test, the test generator router executes an infinite loop routine, each loop instance comprising (1) the execution of ten instances of a loop for generating and transmitting a BGP WITHDRAW message containing timestamp data in the "Route_Distinguisher" field of the BGP WITHDRAW message, with a predetermined interval (for example 0.5 s) between each instance, (2) a predetermined wait time (for example 10 s), (3) execution of another ten instances of a loop for generating and transmitting a BGP WITHDRAW message containing timestamp data in the "Route_Distinguisher" field of the BGP WITHDRAW message, with a predetermined interval (for example 0.5 s) between each instance, and (4) a predetermined wait time (for example 10 sec).

The BGP test generator router therefore sends more or less continuously to an RR router whose processing and propagation time is to be measured, ten WITHDRAW messages which contain route modifications and timestamp data. The RR router processes each of these messages and advertises them to a BGP test receiver router. The BGP test receiver router is configured to receive BGP WITHDRAW messages from the RR router, extract timestamp data from each received BGP WITHDRAW message from the "Route_Distinguisher" field of the message, and determine a measurement of the processing and propagation time required at the RR router for the withdrawal of a route based on its own timestamp and the timestamp data received.

The results of this first test correspond to the higher point cluster of FIG. 4, with a trend line of equation y=0.1213x−5292.9.

The proposed method provides a solution for measuring propagation time in a router or in a network using a routing protocol which is advantageously simple to implement, in particular as it does not require additional development of the routing protocol. The proposed method can thus be implemented by software independently, i.e. without depending on a particular implementation of the routing protocol or on a proprietary device on which it is implemented.

The proposed method also advantageously involves a low computational cost, so it can be implemented in parallel with other tests in order to see the impact of these other tests on the propagation time measured by the proposed method.

Depending on the chosen embodiment, certain acts, actions, events, or functions of each of the methods described herein may be performed or may occur in a different order than that in which they were described, or may be added, merged, or indeed may not be carried out or occur, depending on the case. Furthermore, in some embodiments, certain acts, actions, or events are carried out or occur concurrently and not sequentially.

Although described through a certain number of detailed exemplary embodiments, the proposed control method and the device for implementing an embodiment of the method comprise various variants, modifications, and improvements which will be obvious to those skilled in the art, it being understood that these various variants, modifications, and improvements are within the scope of the present subject disclosure as defined by the claims which follow. Additionally, various aspects and features described above may be implemented together or separately, or may be substituted for each other, and all of the various combinations and sub-combinations of the aspects and features are within the scope of the present subject disclosure. In addition, some systems and devices described above may not incorporate all of the modules and functions described for the preferred embodiments.

The invention claimed is:

1. A method of measuring a propagation time of data routing information in a data communication system comprising a data communication network which comprises a plurality of router nodes operating according to a Border Gateway Protocol (BGP) routing protocol for routing data packets between nodes of the data communication network, the method comprising, at a router node referred to as a generator node:

generating timestamp data for transmission of the data routing information;

inserting the timestamp data into a predefined field of a BGP-UPDATE routing protocol message of the BGP routing protocol that carries the data routing information, the predefined field corresponding to a "withdrawn" part or a "NLRI" part of the BGP-UPDATE routing protocol message and being defined to receive an Internet Protocol (IP) address prefix or a virtual private network (VPN) prefix; and sending the BGP-UPDATE routing protocol message to a different router node referred to as a receiver node, wherein the timestamp data is usable to determine an estimate of the propagation time of the data routing information between the generator node and the receiver node;

wherein the timestamp data are inserted into the predefined field corresponding to the "withdrawn" part or the "NLRI" part of the BGP-UPDATE routing protocol message as the Internet Protocol (IP) address prefix or the virtual private network (VPN) prefix.

2. A method of measuring a propagation time of data routing information in a data communication system comprising a data communication network which comprises a plurality of router nodes operating according to a Border Gateway Protocol (BGP) routing protocol for routing data packets between nodes of the data communication network, the method comprising, at a router node referred to as a receiver node:

receiving, from another router node referred to as a generator node, a BGP-UPDATE routing protocol message of the BGP routing protocol that carries the data routing information;

extracting timestamp data from a predefined field of the received BGP-UPDATE routing protocol message, the predefined field corresponding to a "withdrawn" part or a "NLRI" part of the received BGP-UPDATE routing protocol message and being defined to receive an Internet Protocol (IP) address prefix or a virtual private network (VPN) prefix;

generating current timestamp data; and determining an estimate of the propagation time of the data routing information between the generator node and the receiver node on the basis of the timestamp data from the received BGP-UPDATE routing protocol message and the current timestamp data, wherein the timestamp data are inserted into the predefined field corresponding to the "withdrawn" part or the "NLRI" part of the received BGP-UPDATE routing protocol message as the Internet Protocol (IP) address prefix or the virtual private network (VPN) prefix.

3. The method according to claim 2, further comprising:

extracting, from the received BGP-UPDATE routing protocol message, information relating to a router where the data routing information originated, referred to as the generator node.

4. A data communication network node comprising a processor and a communication interface operatively coupled to the processor, the network node being configured for implementing a method for measuring a propagation time of data routing information in a data communication system comprising a data communication network which comprises a plurality of router nodes operating according to a Border Gateway Protocol (BGP) routing protocol for routing data packets between nodes of the data communication network, the method comprising, at a router node referred to as a generator node:

generating timestamp data for transmission of the data routing information;

inserting the timestamp data into a predefined field of a BGP-UPDATE routing protocol message of the BGP routing protocol that carries the data routing information, the predefined field corresponding to a "withdrawn" part or a "NLRI" part of the BGP-UPDATE routing protocol message and being defined to receive an Internet Protocol (IP) address prefix or a virtual private network (VPN) prefix; and sending the BGP-UPDATE routing protocol message to a different router node referred to as a receiver node, wherein the timestamp data is usable to determine an estimate of the propagation time of the data routing information between the generator node and the receiver node;

wherein the timestamp data are inserted into the predefined field corresponding to the "withdrawn" part or the "NLRI" part of the BGP-UPDATE routing protocol message as the Internet Protocol (IP) address prefix or the virtual private network (VPN) prefix.

5. A non-transitory storage medium for a computer-executable program, comprising a set of data representing one or more programs, the one or more programs comprising instructions for, when the one or more programs are executed by a computer comprising a processor operatively coupled to memory means and to an input/output interface module, causing the computer to implement a method for measuring a propagation time of data routing information in a data communication system comprising a data communication network which comprises a plurality of router nodes operating according to a Border Gateway Protocol (BGP) routing protocol for routing data packets between nodes of the data communication network, the method comprising, at a router node referred to as a generator node:

generating timestamp data for transmission of the data routing information;

inserting the timestamp data into a predefined field of a BGP-UPDATE routing protocol message of the BGP routing protocol that carries the data routing information, the predefined field corresponding to a "withdrawn" part or a "NLRI" part of the BGP-UPDATE routing protocol message and being defined to receive an Internet Protocol (IP) address prefix or a virtual private network (VPN) prefix; and sending the BGP-UPDATE routing protocol message to a different router node referred to as a receiver node, wherein the timestamp data is usable to determine an estimate of the propagation time of the data routing information between the generator node and the receiver node;

wherein the timestamp data are inserted into the predefined field corresponding to the "withdrawn" part or the "NLRI" part of the BGP-UPDATE routing protocol message as the Internet Protocol (IP) address prefix or the virtual private network (VPN) prefix.

6. A data communication network node comprising a processor and a communication interface operatively coupled to the processor, the network node being configured for implementing a method for measuring a propagation time of data routing information in a data communication system comprising a data communication network which comprises a plurality of router nodes operating according to a Border Gateway Protocol (BGP) routing protocol for routing data packets between nodes of the data communication network, the method comprising, at a router node referred to as a receiver node:

receiving, from another router node referred to as a generator node, a BGP-UPDATE routing protocol message of the BGP routing protocol that carries the data routing information;

extracting timestamp data from a predefined field of the received BGP-UPDATE routing protocol message, the predefined field corresponding to a "withdrawn" part or a "NLRI" part of the received BGP-UPDATE routing protocol message and being defined to receive an Internet Protocol (IP) address prefix or a virtual private network (VPN) prefix;

generating current timestamp data; and determining an estimate of the propagation time of the data routing information between the generator node and the receiver node on the basis of the timestamp data from the received BGP-UPDATE routing protocol message and the current timestamp data, wherein the timestamp data are inserted into the predefined field corresponding to the "withdrawn" part or the "NLRI" part of the received BGP-UPDATE routing protocol message as the Internet Protocol (IP) address prefix or the virtual private network (VPN) prefix.

7. The data communication network node according to claim 6, wherein the method further comprises: extracting, from the received BGP-UPDATE routing protocol message, information relating to a router where the data routing information originated, referred to as the generator node.

8. A non-transitory storage medium for a computer-executable program, comprising a set of data representing one or more programs, the one or more programs comprising instructions for, when the one or more programs are executed by a computer comprising a processor operatively coupled to memory means and to an input/output interface module, causing the computer to implement a method for measuring a propagation time of data routing information in a data communication system comprising a data communication network which comprises a plurality of router nodes operating according to a Border Gateway Protocol (BGP) routing protocol for routing data packets between nodes of the data communication network, the method comprising, at a router node referred to as a receiver node:

receiving, from another router node referred to as a generator node, a BGP-UPDATE routing protocol message of the BGP routing protocol that carries the data routing information;

extracting timestamp data from a predefined field of the received BGP-UPDATE routing protocol message, the predefined field corresponding to a "withdrawn" part or a "NLRI" part of the received BGP-UPDATE routing protocol message and being defined to receive an Internet Protocol (IP) address prefix or a virtual private network (VPN) prefix;

generating current timestamp data; and determining an estimate of the propagation time of the data routing information between the generator node and the receiver node on the basis of the timestamp data from the received BGP-UPDATE routing protocol message and the current timestamp data, wherein the timestamp data are inserted into the predefined field corresponding to the "withdrawn" part or the "NLRI" part of the received BGP-UPDATE routing protocol message as the Internet Protocol (IP) address prefix or the virtual private network (VPN) prefix.

9. The non-transitory storage medium according to claim 8, wherein the method further comprises: extracting, from the received BGP-UPDATE routing protocol message, information relating to a router where the data routing information originated, referred to as the generator node.

* * * * *